US007161147B1

(12) United States Patent

Chang et al.

(10) Patent No.: US 7,161,147 B1
(45) Date of Patent: Jan. 9, 2007

(54) BIOLOGICAL WHOLE CELL MASS SPECTROMETER

(75) Inventors: Huan-Cheng Chang, Taipei (TW); Joseph W. Ting, Taipei (TW)

(73) Assignee: Academia Sinica, Taipei (TW)

( * ) Notice: Subject to any disclaimer, the term of this patent is extended or adjusted under 35 U.S.C. 154(b) by 4 days.

(21) Appl. No.: 11/134,616

(22) Filed: May 20, 2005

(51) Int. Cl.
*H01J 39/34* (2006.01)
*B01D 59/54* (2006.01)

(52) U.S. Cl. ...................... 250/292; 250/282; 250/288; 250/281; 702/22.28; 435/6

(58) Field of Classification Search ..................... None
See application file for complete search history.

(56) References Cited

U.S. PATENT DOCUMENTS

| | | | | |
|---|---|---|---|---|
| 4,075,475 | A * | 2/1978 | Risby et al. | 250/282 |
| 6,675,104 | B1 * | 1/2004 | Paulse et al. | 702/22 |
| 6,777,673 | B1 | 8/2004 | Chang et al. | |
| 2004/0209260 | A1 * | 10/2004 | Ecker et al. | 435/6 |

OTHER PUBLICATIONS

Bacher et al. "Charge-reduced nano electrospray ionization combined with differential mobility analysis of peptides, proteins, glycoproteins, noncovalent protein complexes and viruses". Journal of Mass Spectrometry 36:1038-1052, 2001.

Fuerstenau et al. "Mass Spectrometry of an Intact Virus". Angew. Chem. Int. Ed. 40(3):542-544, 2001.

Hars et al. "Application of a quadrupole ion trap for the accurate mass determination of submicron size charged particles". J. Appl. Phys. 77(9):4245-2450, May 1, 1995.

Schlemmer et al. "Nondestructive high-resolution and absolute mass determination of single charged particles in a three-dimentional quadrupole trap". Journal of Applied Physics 90(10):5410-5418, Nov. 15, 2001.

Siuzdak. "Probing Viruses with Mass Spectrometry". Journal of Mass Spectrometry 33:203-211, 1998.

Tito et al. "Electrospray Time-of-Flight Mass Spectrometry of the Intact MS2 Virus Capsid". J. Am. Chem. Soc. 122:3550-3551, 2000.

Wuerker et al. "Electrodynamic Containment of Charged Particles". Journal of Applied Physics 30(3):342-349, Mar. 1959.

* cited by examiner

*Primary Examiner*—Jack Berman
*Assistant Examiner*—Zia R. Hashmi
(74) *Attorney, Agent, or Firm*—Fish & Richardson P.C.

(57) ABSTRACT

A method for identifying a biological organism that includes providing a biological sample corresponding to the biological organism, ionizing the biological sample to produce an ionized sample of the biological sample, performing a mass spectrometry analysis of the ionized sample, and identifying the biological organism in accordance with the mass spectrometry analysis.

38 Claims, 9 Drawing Sheets

BIOLOGICAL WHOLE CELL MASS SPECTROMETER

TECHNICAL FIELD

This invention relates to mass spectrometry, and more particularly to mass determination and identification of biological samples using mass spectrometry.

BACKGROUND

Measuring masses of intact microorganisms holds much interest for the scientific community. Biomass measurements, for example, are useful for determining growth rates and cell yields of the microorganisms of interest.

The conventional ways of quantifying biomass involve both flow cytometry and gravimetric determination. While these methods can be sufficiently accurate, they are laborious and time-consuming. Recently, new technologies, such as quartz crystal microbalances, superconducting quantum interference devices and micromechanical oscillators, have been developed to detect and weigh a single microorganism. However, the errors involved in biomass measurements using these techniques are relatively large (typically more than 10%).

Although mass spectrometry techniques may be useful for determining the mass of relatively small particles, mass spectrometry techniques have been considered ill-suited for mass determination of large biological organisms (e.g., biological organisms having masses in excess of $1\times10^9$ Daltons). In part, this is because biological organisms are massive enough to make it difficult to accelerate them to the velocity required for detection using known mass spectrometry techniques.

SUMMARY

In one aspect, the invention includes a method for identifying a biological organism. The method includes providing a biological sample corresponding to the biological organism, ionizing the biological sample to produce an ionized sample of the biological sample, performing a mass spectrometry analysis of the ionized sample, and identifying a species of the biological organism in accordance with the mass spectrometry analysis of the ionized sample.

In some embodiments, providing the biological sample includes providing a sample having a mass of at least $1\times10^9$ Da.

In certain embodiments, ionizing the biological sample includes performing, on the biological sample, at least one of Matrix-Assisted Laser Desorption Ionization (MALDI), Electrospray ionization, and/or Laser-Induced Acoustic Desorption (LIAD).

In some embodiments, performing MALDI includes placing the biological sample in a solution matrix, drying the matrix, and irradiating the dried matrix with laser illumination.

In some embodiments the method also comprises selecting the solution matrix to include at least one of sinapinic acid (SA), 4-hydroxy-α-cyanocinnamic acid (4HCCA), and/or 2-(4-hydroxy-phenylazo)-benzoic acid (HABA).

In certain embodiments, irradiating the matrix with laser illumination includes irradiating with a pulsed laser light.

In some embodiments, performing the mass spectrometry analysis includes directing the ionized sample to a Quadrupole Ion Trap (QIT), applying an AC voltage to the QIT, and causing the ionized sample to be in one of a plurality of charge states for the ionized sample.

In certain embodiments, the method also includes projecting light on the ionized sample while the sample is in one of the charge states.

In some embodiments, applying the AC voltage includes choosing at least one of an adjustable amplitude and/or adjustable frequency to cause ejection of at least some of the ions in the ionized sample from the QIT.

In some embodiments, the method also includes, for each of the plurality of charge states, choosing a frequency of the AC voltage to achieve resonance conditions within the QIT.

In some embodiments, causing the ionized sample to be in one of a plurality of charge states includes illuminating the ionized sample with an electron beam.

In some embodiments, illuminating with laser light includes illuminating with continuous visible laser.

In some embodiments, the method comprises collecting light scattered from the ionized sample, and guiding the collected scattered light to a detector.

In some embodiments, identifying the biological organism sample includes for each of the plurality of produced charge states of the ionized sample, identifying characteristics indicative of a mass/charge relationship associated with the ionized sample in that charge state, and estimating a mass, m, of the ionized sample, based on the characteristics.

In some embodiments, identifying characteristics includes determining a number of branches, n, of the star patterns associated with the trajectory of the ionized sample in the QIT.

In some embodiments, estimating the mass, m, of the ionized sample includes assigning sets of values for each of the plurality of charge states produced, computing respective average mass values and corresponding standard deviation values for each of the assigned sets of values, selecting, from the respective computed average mass values, the average mass value having the minimum corresponding standard deviation, and assigning the selected average mass value to be an estimate of the mass of the ionized sample.

In some embodiments, the method further comprises identifying from a list of mass values associated with corresponding biological organisms, that organism having an associated mass consistent with the estimated mass value.

In another aspect, the invention includes an apparatus for identifying biological organisms. The apparatus comprises a receptacle that receives a biological sample associated with the biological organism, an ionization module that ionizes the biological sample to produce an ionized sample, a mass spectrometry analyzer that analyzes the ionized sample, and a processing module that identifies the biological organism in accordance with the analysis of the ionized sample.

In some embodiments, the receptacle is configured to receive a biological sample having a mass of at least $1\times10^9$ Da.

In some embodiments, the ionization module is configured to perform, on the biological sample, at least one of Matrix-Assisted Laser Desorption Ionization (MALDI), Electrospray ionization, and/or Laser-Induced Acoustic Desorption (LIAD).

In some embodiments, the receptacle is configured to hold a solution matrix, and the ionization module may comprise a first laser for irradiating the matrix with laser illumination. The matrix includes at least one of sinapinic acid (SA), 4-hydroxy-α-cyanocinnamic acid (4HCCA), and/or 2-(4-hydroxy-phenylazo)-benzoic acid (HABA). The first laser includes a pulsed UV laser.

In some embodiments, the mass spectrometry analyzer comprises a Quadrupole Ion Trap (QIT) that receives the ionized sample, an AC voltage source that is applied to the QIT to cause radial motion of the ionized sample in the QIT, a charging module that causes the ionized sample to be in one of a plurality of charge states, and a light source that projects light on the ionized sample while the ionized sample is in one of the charge states.

In some embodiments, the AC voltage has an adjustable amplitude and/or an adjustable frequency, the amplitude and frequency being adjustable to values that cause ejection of at least some of the ions in the ionized sample from the QIT.

In some embodiments, the adjustable frequency is adjustable to achieve resonance conditions within the QIT for each of the plurality of charge states.

In some embodiments, the charging module comprises an electron beam generator that illuminates the ionized sample with an electron beam.

In some embodiments, the light source includes a second laser. One such laser is a continuous visible laser.

In some embodiments, the apparatus further comprises optical lenses that collect the light scattered from the ionized sample, and a charge-coupled device (CCD) that receives the collected scattered light.

In another aspect, the invention includes a computer product stored on a computer-readable medium containing instructions to facilitate identifying a biological organism from a biological sample such that, when executed on a processor-based device, the instructions may cause the processor-based device to receive a plurality of parameters, each corresponding to a plurality of value mass/charge relationship values associated with a respective plurality of charge states produced for the sample, assign sets of values for each of the plurality of charge states produced, compute respective average mass values and corresponding standard deviation values for each of the assigned sets of values, select, from the respective computed average mass values, the average mass value having the minimum corresponding standard deviation, and assign the selected average mass value to be an estimate of the mass of the ionized sample.

In some embodiments, the computer product further contains instructions that cause the processor-based device to identify, from a list of known species, the species having substantially the same mass as the selected mass value.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
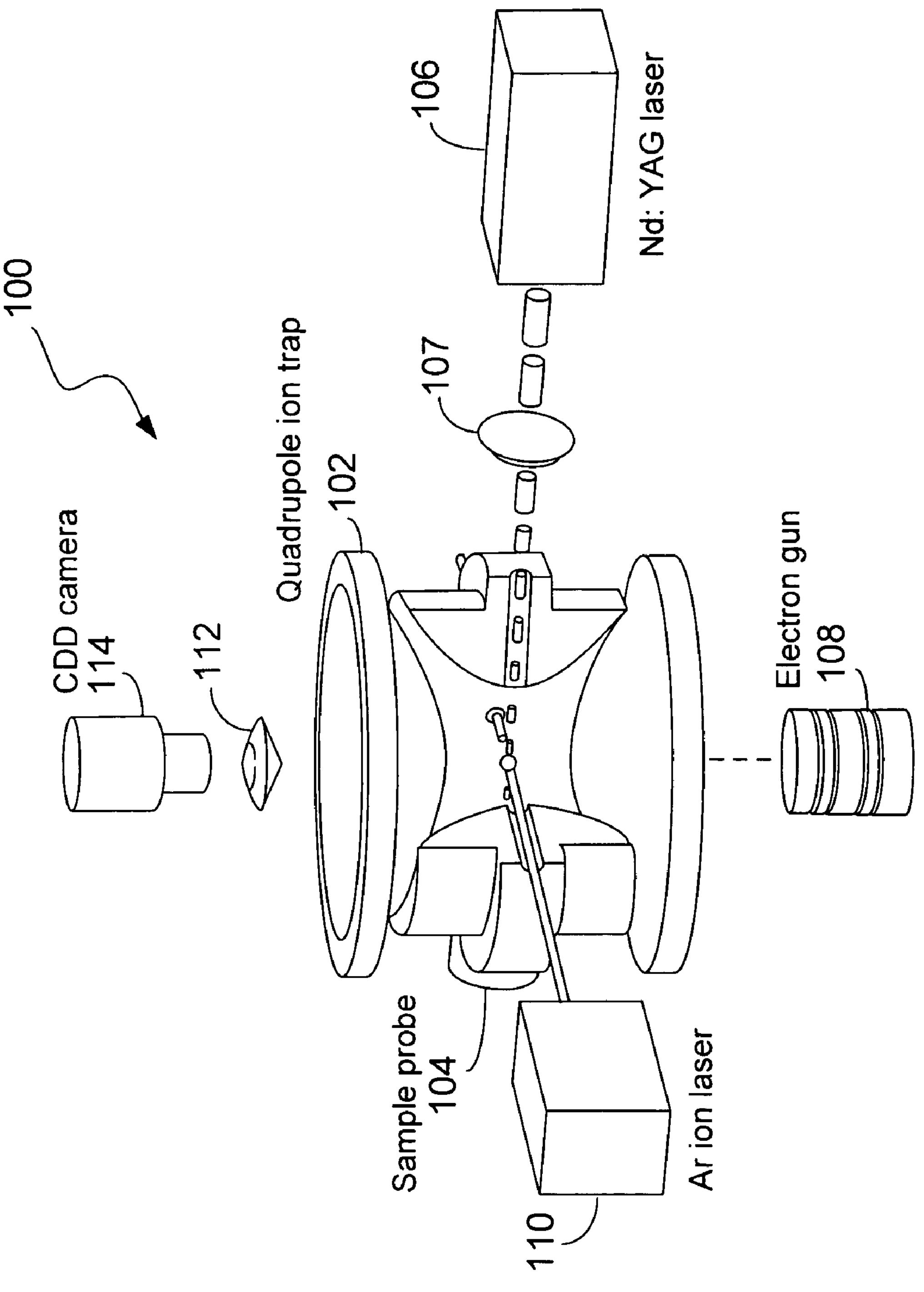
FIG. 1 is a front-side perspective of a schematic diagram of an apparatus for determining the mass of a particle(s) from a biological sample.

FIG. 1 shows a front-side perspective of a schematic diagram of the apparatus 100 used for measuring the mass of a particle from a sample that contains biological organisms, such as, for example, bacteria and viruses, including bacteria and viruses having masses larger than $1\times10^9$ Da. It will be clear, however, that the apparatus and methods described herein may be applied to other types of biological organisms and/or non-biological organisms of varying masses.

Figure 2:
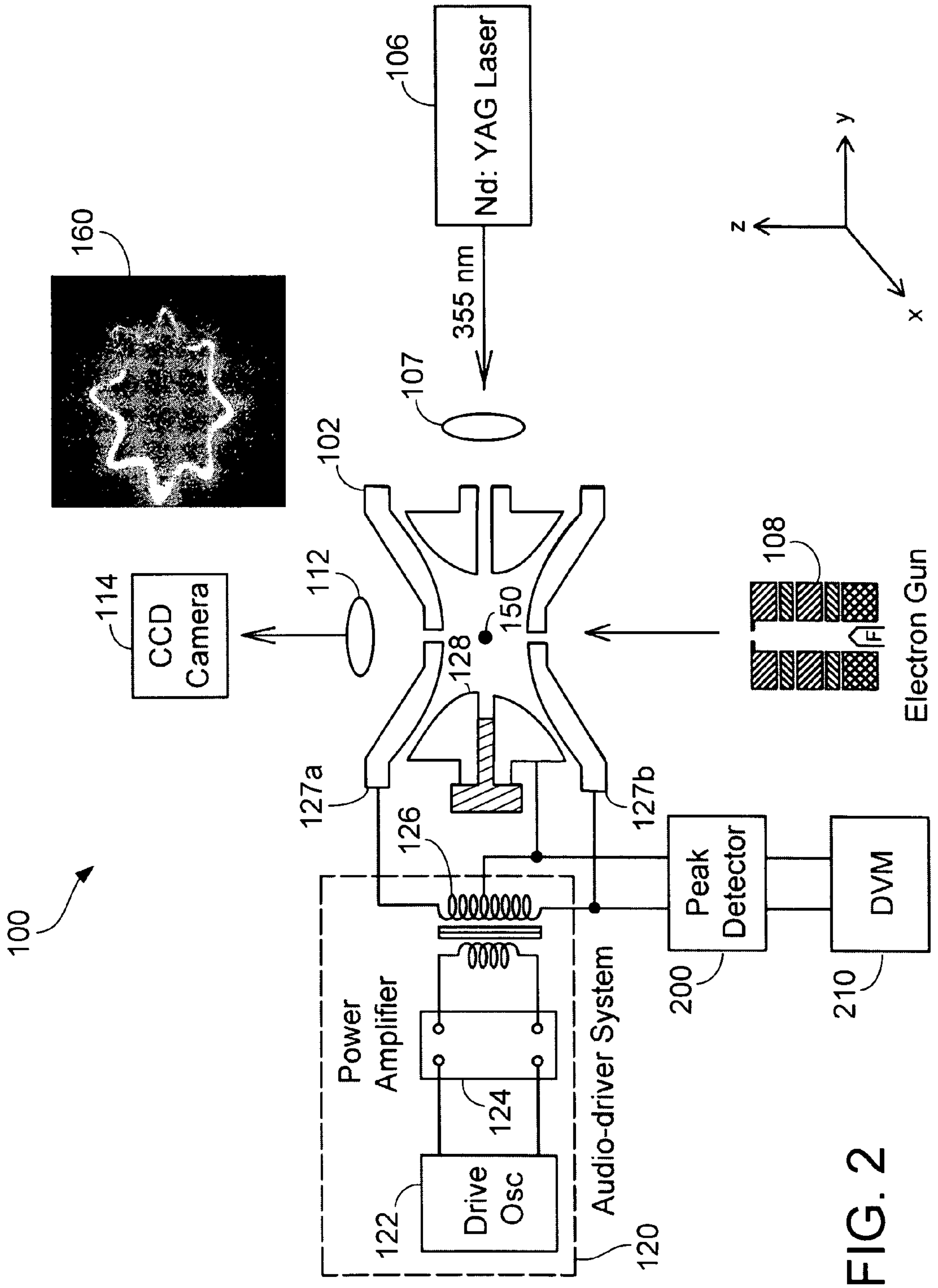
FIG. 2 is a cut-away view of the apparatus shown in FIG. 1.

FIG. 2 shows a cut-away view of the apparatus shown in FIG. 1. As shown in FIGS. 1 and 2, apparatus 100 may include a Quadrupole Ion Trap (QIT) 102 for receiving a receptacle or probe 104 containing the biological sample. QIT 102 may be any commercially available QIT mass analyzer such as, for example, the Jordan C-1251 QIT. The QIT 102 produces, through the action of several electrodes, including, for example ring electrode 128 and end-cap electrodes 127*a* and 127*b*, a 3D quadrupole potential field that traps ions formed from the biological sample into an oscillatory trajectory. The exact motion of an ionized particle 150 (shown in FIG. 2) within the trap depends on the applied voltages, driving frequency, and the individual mass-to-charge values of the trapped particle (although reference is made to one particle, it will be understood that more than one particle may be inside the QIT 102). Thus, the mass-to-charge value of a trapped ionized particle may be determined based on its motion and the value of the QIT's applied voltages and driving frequency.

An ionized particle's mass-to-charge ratio can be expressed as its m/Ze value, where m is the mass of the particle, Z is its charge number (corresponding to its charge state or level), and e is the elemental charge, which is approximately $1.6\times10^{-19}$ Coulomb. This ratio may be determined from $\omega_r$, the radial frequency (sometimes referred to as the secular frequency) of the particle oscillating in the radial direction. For an ionized particle confined in the three-dimensional quadrupole ion trap, the radial frequency is related to the trap driving frequency, $\Omega$, by:

$$\omega_r = \frac{\beta_r \Omega}{2}, \quad (1)$$

where the stability boundary $\beta_r$, under conditions where the trap parameter $$a_r = \frac{8ZeV_{dc}}{mr_0^2\Omega^2} = 0,$$

is approximated by:

$$\beta_r = \left(\frac{q_r^2}{2-q_r^2} - \frac{7}{128}q_r^4 + \frac{29}{2304}q_r^6\right)^{\frac{1}{2}}. \quad (2)$$

When resonance conditions inside the QIT 102 are met, the ionized particle 150's oscillatory motion forms a stationary star-shaped pattern having n branches, as shown in the inset 160 in FIG. 2. When this occurs the ionized particle's radial frequency may be expressed as:

$$\omega_r = \frac{\Omega}{2}, \quad (3)$$

The reciprocal of the star branch number n can be then expressed as a polynomial function of $q_r$:

$$\frac{2}{n} = \frac{q_r}{\sqrt{2}}\left(1 + \frac{25}{128}q_r^2 + \frac{34951}{294912}q_r^4 - \frac{7925}{294912}q_r^6 - \frac{100489}{10616832}q_r^8\right), \quad (4)$$

where $$q_r = \frac{4ZeV_{ac}}{mr_0^2\Omega^2} = C\frac{V_{ac}}{(\Omega/2\pi)^2}. \quad (5)$$

where $V_{ac}$ is the amplitude of the trap driving AC voltage, and $r_0$ is the radius of the ring electrode. In the experiments conducted for testing the apparatus of FIGS. 1 and 2, the diameter of the ring electrode used was 19.97 mm with an uncertainty of 0.1% (±0.02 mm).

The parameter C may be defined as:

$$C \equiv \frac{Ze}{mr_0^2\pi^2}, \quad (6)$$

By fitting the experimental data plotted in terms of 2/n versus $V_{ac}(\Omega/2\pi)^2$ to Equation (4), C, and thus m/Ze may be determined. As will become apparent below, the mass m of the ionized particle may thus subsequently be determined. It is to be noted that the accuracy of the m/Ze measurement is governed by, among other things, the accuracy with which $r_0$, $V_{ac}$ and $\Omega$ are known.

To perform mass spectrometry analysis on a sample introduced into the QIT 102 using probe 104, the sample's molecules have to be ionized. As shown in FIGS. 1 and 2, ionization of the sample may be performed, for example, by placing the sample in a matrix solution (not shown). The matrix solution may include sinapinic acid (SA), 4-hydroxy-α-cyanocinnamic acid (4HCCA), and/or 2-(4-hydroxy-phenylazo)-benzoic acid (HABA). Other types of matrix solutions may also be used.

The matrix solution is then irradiated by laser illumination from a pulsed UV laser 106. A suitable pulsed UV laser 106 is a frequency tripled Nd:YAG laser. Laser illumination is focused on the sample using focusing lens 107. In this ionization technique, referred to as "Matrix-Assisted Laser Desorption Ionization" (MALDI), the matrix solution shields the biological sample from direct contact with the ionizing laser illumination. This tends to avoid destruction of the sample being investigated.

The matrix solution, with the biological sample, is subsequently deposited in a stainless steel probe 104. The matrix solution may be subjected to further processing before or after being irradiated by laser illumination. For example, the matrix solution may be dried using a desiccator. The probe 104 is subsequently placed in a hole on the ring electrode 128 of the QIT 102.

To ensure that that the ionized particle to be introduced into the QIT 102 for mass spectrometry analysis includes few, if any, of the solvents and/or components of the matrix solution, and to minimize damage to the biological sample during laser illumination, the matrix solution containing the biological sample is irradiated at low power. Damage to the biological sample by laser illumination may also be minimized by, for example, avoiding repetitive exposure of the matrix solution to laser irradiation. Accordingly, in some embodiments, laser power may be set to approximately $1\times10^6$ W/cm$^2$. It will be understood that the type and/or composition of the matrix solution may be selected to avoid ionizing its constituents with the laser illumination.

Other ionization techniques may be used to form the ionized particles that are to be investigated. For example, electrospray ionization may be performed on the biological sample to create a plume of ionized particles on which further mass spectrometry analysis may be performed. Additionally and/or alternatively, Laser-Induced Acoustic Desorption (LIAD) techniques may be used to produce the ionized particles. Other ionization techniques, and other types of ionization devices may also be used.

The ionized particles 150 are thus directed to the QIT 102. To ensure that the ionized particles entering the QIT remain inside it, a buffer gas damps the motion of the ionized particles as they pass through the QIT 102. One such buffer gas is helium maintained at a pressure of approximately 1 mTorr inside the QIT 102. Other type of gases and/or other damping media, as well as other damping techniques, may be employed to facilitate trapping the ionized particles inside QIT 102.

With reference to FIG. 2, once an ionized particle 150 of the biological sample reaches the QIT 102, an AC voltage source 120 is applied to create an electric field inside the QIT 102 that traps the ionized particle 150 in an oscillatory motion.

In the illustrated embodiment, the AC voltage source 120 includes a driver oscillator 122 that generates voltages having an adjustable amplitude and/or an adjustable frequency. For example, the driver oscillator 122 may be a synthesized function generator that generates sinusoidal voltage signals having frequencies in the audio frequency range (e.g., 100 Hz–2000 Hz), and adjustable amplitude levels. The voltage signal generated by the driver oscillator 122 may be automatically controlled by a processor-based device. Additionally and/or alternatively, the frequency and amplitude of the signal generated by driver oscillator 122 may be manually controlled by a user.

Coupled to the driver oscillator 122 is a power amplifier 124 that drives the input terminals of a transformer 126. A voltage signal $V_{ac}$ having an adjustable amplitude and frequency is thus generated at the output terminals of the transformer 126. These output terminals are coupled to the end-cap electrodes 127*a* and 127*b*. It will be appreciated that other type of electrical configurations may be used to create, inside the QIT 102, electric fields required for mass spectrometry analysis of an ionized particle 150. For example, in addition to the voltage $V_{ac}$ that is applied between the end-caps 127*a* and 127*b*, a small DC voltage may be applied between the end-cap electrodes 127*a* and 127*b* to counteract gravitational forces. A description of various configurations for creating an electric field inside a QIT, and a description of the operation of a QIT, are provided, for example, in U.S. Pat. No. 6,777,673, entitled "Ion Trap Mass Spectrometer", the entire content of which is hereby incorporated by reference.

When the biological sample becomes ionized and directed towards the QIT 102, certain errant ionized particles may also be swept into the QIT 102. One source of such errant particles is the matrix solution utilized in the MALDI-based ionization procedure. Since the presence of these errant ionized particles may skew the results of the mass spectrometry analysis that is to be performed on the biological sample under investigation, it is necessary to remove, or eject them. Whether an ionized particle becomes trapped in the QIT 102 depends on that particle's mass and charge, the dimensions of the QIT 102, and/or the frequency and amplitude of the applied voltage $V_{ac}$. For example, for a single bacterial particle, the trapping conditions for a model C-1251 from R. M. Jordan Company, having a trap diameter of 19.97 mm, require a voltage signal having a frequency of 300 Hz and amplitude of 715 V. Thus, to eject errant ionized particles that may have also reached the QIT 102, the voltage amplitude of the generated voltage $V_{ac}$ is controlled so as to ramp it up from a low voltage amplitude to the voltage amplitude corresponding to the amplitude at which that ionized particle under investigation is stably trapped (e.g., 715 V). By gradually increasing the amplitude of voltage $V_{ac}$, particles having lower mass-to-charge ratios than that of the particle under investigation, including ionized particles from the matrix solution used in the MALDI process, may be ejected from the trap, leaving the particle under investigation in the QIT 102.

Once errant ionized particles have been removed from the trap 102, the frequency of the driving voltage may be manually or automatically adjusted until resonance conditions within the QIT 102 are achieved. When this occurs the ratio of the driving frequency, Ω, of the driving voltage signal and the radial frequency $\omega_r$ (i.e., the ionized particle's oscillatory frequency within the trap 102) is an integer value, n, and the radial trajectory of the ionized particle is observed to form a stationary pattern. One such pattern is the star pattern seen in inset 160 in FIG. 2. The number of branches, n, of the star pattern equals the ratio of the frequency of the driving voltage and the ionized particle's radial frequency such that, under resonance conditions, $\Omega=n\omega_r$. The stationary pattern formed by the ionized particle's radial trajectory may be observed using, for example, a CCD camera 114 that captures light scattered from the trapped oscillating particle after the particle has been illuminated with a continuous light source, such as the laser 110 shown in FIG. 1. Characteristics of the observed stationary pattern, such as the number of branches of the star pattern, may thus be identified. Since the observed characteristics, for example, the number of branches n of the star pattern, are related to the mass-to-charge value of the particle, and to the frequency and amplitude of the driving voltage (as more particularly provided by Equations (4)–(6)) the mass-to-charge value, or more particularly the m/Ze value, for the ionized particle 150 may thus be determined when resonance conditions at the QIT 102 are met.

As illustrated by Equations (1)–(6), the value of the particle 150's radial oscillating frequency ($\omega_r$) depends, in part, on the applied voltage amplitude ($V_{ac}$). Accordingly, to achieve accurate determination of, for example, the value m/Ze of the particle 150, depends to some extent on accurate determination of the voltage amplitude $V_{ac}$. As shown in FIG. 2, determination of the voltage amplitude $V_{ac}$ may be performed using, for example, the averaging peak-to-peak voltage detector 200 and a voltmeter 210, such as, for example, the Keithley 2000 digital voltmeter.

As explained, by creating resonance condition within QIT 102, thereby causing a stationary trajectory pattern of particle 150 to form, it is possible to determine the value m/Ze of the particle 150. However, the value m/Ze in and of itself does not provide definitive information about the mass, m, of the particle 150 since there are infinite combinations of m and Z that would yield the same m/Ze value. One way, therefore, to determine the mass of the particle 150 is to produce several different charge states for the same particle 150, and thus produce several different m/Ze values for the same particle 150. Since for those m/Ze values generated the mass m of particle 150 remains the same, it is possible on the basis of the plurality of generated m/Ze values, corresponding to the plurality of charge states, to determine the mass m.

To generate a plurality of charge states for the particle 150 required for subsequently determining the mass m of the particle, a charging module, such as an electron gun 108 shown in FIGS. 1 and 2 may be used. The electron gun 108 produces an electron beam emanating, for example, from a hot tungsten filament. This beam is directed through one of the holes on one of the end-cap electrodes 127*a*, 127*b*. The electron beam strikes the particle 150 and induces a change in the charge state of the particle 150. Since the ionized particle 150 produced from the biological sample under investigation may include a large number of electrons, it may be feasible to induce multiple charge states for the particle 150, and to thereby improve the accuracy with which the particle's mass may be determined. It will be understood that the charging module may be one of different types of devices or systems that can be used to induce different charge states for the particle 150. For example, the charging module 108 used may include a device that generates UV radiation that is thereafter directed at the particle under investigation.

Once the charge state of the particle 150 has been changed, the particle 150, now moving in a radial trajectory controlled by the electric field inside QIT 102, will lose its stationary trajectory pattern. Accordingly, when the particle's trajectory becomes unstable, it is necessary to re-adjust the driving frequency, Q, of the driving voltage signal to achieve resonance conditions within the QIT 102 corresponding to the particle's new charge state.

To visually display the trajectory pattern of the particle 150, thereby enabling adjustment of the driving frequency of the QIT 102 so as to achieve stationary trajectory patterns for the particle 150, a light source used for generating scattered light is used. When coherent and monochromatic light, such as light generated from a laser, is projected on a particle, it is possible to observe time-dependent fluctuations in the scattered intensity using suitable detectors. Accordingly, the time-dependent motion of a particle, such as the particle 150, may be observed. Thus, as shown in FIG. 1, a light source 110 illuminates particle 150 with coherent monochromatic light. A suitable light source is a laser such as an Ar Ion laser light scattered by the particle 150 is subsequently collected by optical lenses 112 and directed to a light capturing device 114, such as a charge-coupled device (CCD) camera. A display device (not shown) coupled to the light capturing device 114 displays the light scattered from the particle 150, and thus displays the radial trajectory motion of the particle. Based on the displayed trajectory patterns, adjustments to the driving frequency of the driving voltage signal generated by voltage source 120 may be performed. Such adjustments may be performed manually by a user, or automatically using a processor-based device. When a stationary trajectory pattern is displayed on the display device, the observable characteristics, such as the number of branches on the stationary star pattern, are recorded and used to determine the m/Ze values for the particle 150 (or more particularly the values C corresponding to the m/Ze values, as shown in Equations (5)–(6)).

Figure 3:
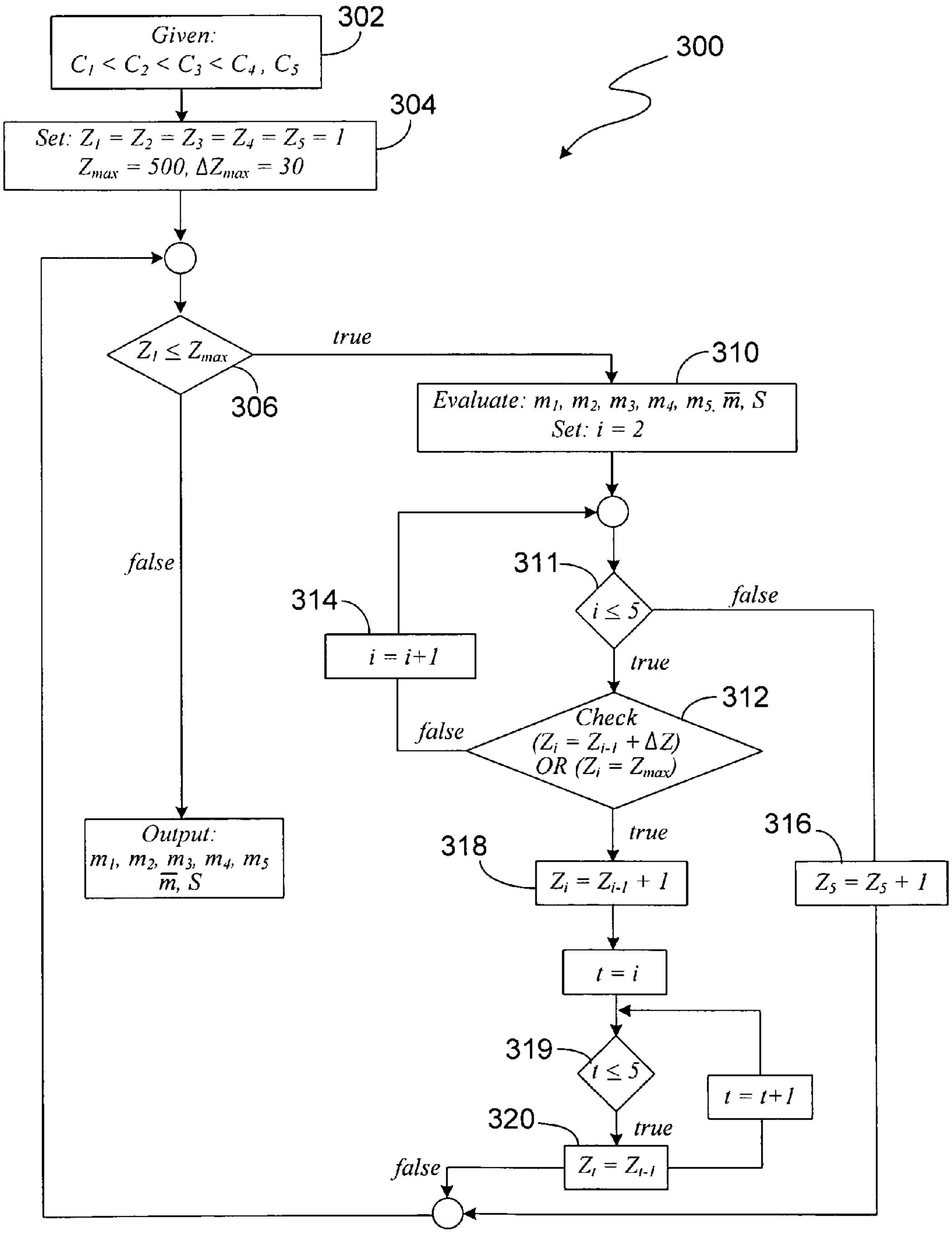
FIG. 3 is a flow chart of an embodiment of a procedure for determining the value of the mass of the biological sample particle(s) analyzed using the apparatus of FIGS. 1 and 2.

Having determined the m/Ze, or C, values for a particle 150 in each of several charge states, the value of the mass of the particle is determined using a procedure 300 shown in FIG. 3. As shown, initially several values of C, corresponding to the m/Ze values, may be provided 302 to a processor-based device (not shown).

Processor-based devices that receive the values corresponding to the m/Ze values (such as C) and use them to perform computations for determining the value of the mass m for the particle 150, may include a computer and/or other types of processor-based devices suitable for multiple applications. Such devices can comprise volatile and non-volatile memory elements, and peripheral devices to enable input/output functionality. Such peripheral devices include, for example, a CD-ROM drive and/or floppy drive, or a network connection, for downloading software containing computer instructions to enable general operation of the processor-based device, and for downloading software implementation programs to determine the mass of a particle 150. Such a processor-based device may be dedicated exclusively to determine the mass of the particle 150, or it may be utilized to carry out other functions as well.

The values of C provided may have been computed using Equations (4)–(6). Particularly, through Equation (4) the value $q_r$, may be derived using the value branch number n identified from the stationary star pattern. The value of the parameter C may then be found using Equation (5) by substituting into that equation the determined and/or known values of $q_r$, $V_{ac}$, and Ω. Although FIG. 3 shows five (5) computed values of C being provided ($C_1$, $C_2$, $C_3$, $C_4$, and $C_5$ arranged in the order of $C_1<C_2<C_3<C_4<C_5$) it will be appreciated that fewer or more such computed values may be provided as is desired, depending on the accuracy required for determining the mass m of the particle 150. Furthermore, it will also be appreciated that other values corresponding to the m/Ze values, or more generally to the mass-to-charge ratios for the particle 150, may be provided.

Where C values are computed and provided, the mass m, given a particular value of Z, may be computed based on the relationship:

$$m \equiv \frac{Ze}{Cr_0^2\pi^2}, \quad (7)$$

Thus, to determine m, the right value of Z (i.e., the charge number for the particle 150) for a given value of C needs to be determined. To find the proper value of Z for a given C, the procedure 300 first sets, or assigns 304 the values of Z's, corresponding to each of the provided values of C, to 1. Additionally, the procedure 300 also sets a maximum value that the various Z values may take. This maximum value, represented as $Z_{max}$, corresponds to the highest charge number that the particle 150 may plausibly assume. For example, although the identity of the biological sample under investigation may not be known, it may nevertheless be known, under certain circumstances, that whatever the biological organism the particle 150 may be, it cannot have a charge number higher than $Z_{max}$. By setting a maximum charge number, for example to $Z_{max}=500$, the number of computations that need to be carried out may be drastically reduced, thereby leading to a computational efficiency improvement in the performance of the procedure 300, since computations involving assigned values of Z higher than the limit set in $Z_{max}$ will not have to be performed.

Another parameter that may be used to reduce the number of computations by limiting the range of plausible values assigned to the various Z's is the maximum allowed step size between adjacent charge states. A reasonable assumption that may be made under certain circumstances is that the difference in the value of adjacent charge states cannot exceed a certain limit provided in the parameter ΔZ. Thus, this parameter requires that the difference between two adjacent charge states, or numbers, for example, $Z_1$ and $Z_2$, cannot exceed ΔZ. In the example shown in FIG. 3, the parameter ΔZ was set to 30.

Next, a determination is made of whether the lowest charge state, $Z_1$ has reached the maximum plausible value represented by $Z_{max}$ (step 306). If it has not, the mass value, corresponding to each value of Z currently used (i.e., the assigned current values of $Z_1, \ldots, Z_N$, where N=5 in the example shown in FIG. 3) is evaluated using, for example, Equation (7). This results in generating respective values for $m_1, \ldots, m_N$ (step 310). In general, every particular set of values for $Z_1, \ldots, Z_N$ generally yields different values for its respective mass values (i.e., for the respective $m_1, \ldots, m_N$). However, the mass of the particle 150 remains constant regardless of the charge state that particle is in, and thus a set of values of $Z_1, \ldots, Z_N$ which yields respective mass values $m_1, \ldots, m_N$ that are closest to each other, will be considered to be the most likely set of Z values corresponding to the various charges states generated for the particle 150. In other words, the computed average mass value m for the set of mass values, $m_1, \ldots, m_N$ (corresponding to a particular set of Z values, $Z_1, \ldots, Z_N$) that has the lowest standard deviation from that average value, may be considered to be the most likely mass value for the particle 150. Thus, in one embodiment, the evaluation (step 310) also includes evaluating for each set of assigned Z values, $Z_1, \ldots, Z_N$, the average mass value m, and the standard deviation, S, corresponding to the particular set of Z values. Computation of the average mass value may be performed, for example, using Equation (8):

$$\overline{m} = \frac{1}{N}\sum_{i=1}^{N} m_i \tag{8}$$

The standard deviation, S, may be computed, for example, using Equation (9):

$$S = \sqrt{\frac{1}{N-1}\sum_{i=1}^{N}(m_i - \overline{m})^2}\,. \tag{9}$$

It will, however, be appreciated that there are alternative ways for computing the average mass value and/or standard deviation corresponding to a particular set of computed masses $m_1, \ldots, m_N$. Furthermore, it will also be appreciated that determination of the likely value of the mass m of the particle 150 may be achieved using other techniques.

The various computed values for a particular set of assigned Z values, including, for example, the respective mass values $m_1, \ldots, m_N$, the average mass value, and standard deviation, may be recorded. Subsequently, once a particular set of assigned Z values has been used to determine corresponding mass values, average mass, and standard deviation, the next set of assigned Z valued may be used to compute the next set of corresponding mass values, average mass, and standard deviation.

When determining the next set of Z values for $Z_1, \ldots, Z_N$, another constraint that may be imposed on the plausible values that each of the Z values may assume is that consecutive Z values cannot have a lower charge number Z than the charge number values preceding them. Thus, for example, $Z_4$ cannot have a value that is lower than that of $Z_1, \ldots, Z_3$. Accordingly, assignment of Z values may be performed by, for example, first incrementing the values of the higher-end Z values until one of the constraints used (e.g., the constraints involving $\Delta Z$ and/or $Z_{max}$) is not satisfied.

For example, when $Z_4$ has an assigned value of 1, $Z_5$ has an assigned value of 31, and $\Delta Z$ is set to 30, for the next set of assigned values of $Z_1, \ldots, Z_N$, $Z_5$'s value cannot be incremented since its value would then exceed $Z_4$'s value by more than $\Delta Z$. When one of the imposed constraints is breached, the value of a lower-end Z value is incremented, and the values of all Z values following it are set to the same value. Thus, in the example used herein, after $Z_5$ has reached a value of 31, on the next value assignment cycle $Z_4$'s value would be incremented to 2, and $Z_5$'s value would be set to 2.

Accordingly, as shown in FIG. 3, after the evaluation (step 310) of the masses the average mass and the standard deviation corresponding to the current Z value assignment, a check is performed to determine if any imposed constraint would be breached if the Z values for any of $Z_1, \ldots, Z_N$ were to be incremented (step 312). Thus, for example, the check performed 312 may determine if successive Z values are not already within $\Delta Z$ of each other, or whether any Z value has not already reached the maximum allowed value as indicated by $Z_{max}$. The check is performed by sequentially increasing an index value, represented as i, that is used to sequentially check the various Z values used (step 314).

If the constraints used continue to be satisfied, then upon reaching the end of the index (i.e., when i=N, at 311), the highest-end Z will be incremented (step 316). If one of the constraints is not satisfied, then the Z value with respect to which one of the constraints is no longer satisfied is incremented (step 318). In the example described above, with $Z_5$'s value already being $\Delta Z$ higher than $Z_4$'s value, the next Z value to be incremented would be $Z_4$'s value.

Next, all the Z values following the incremented Z value are set to the same value as that of the incremented Z value (step 320). The increment procedure may be performed, for example, using an index, t, which determines (step 319) when the index has reached the value N (which, in the example used with respect to FIG. 3, N=5). The procedure illustrated in FIG. 3 is repeated until the lowest-end Z value, namely $Z_1$, reaches the maximum allowed value indicated by $Z_{max}$.

Figure 4:
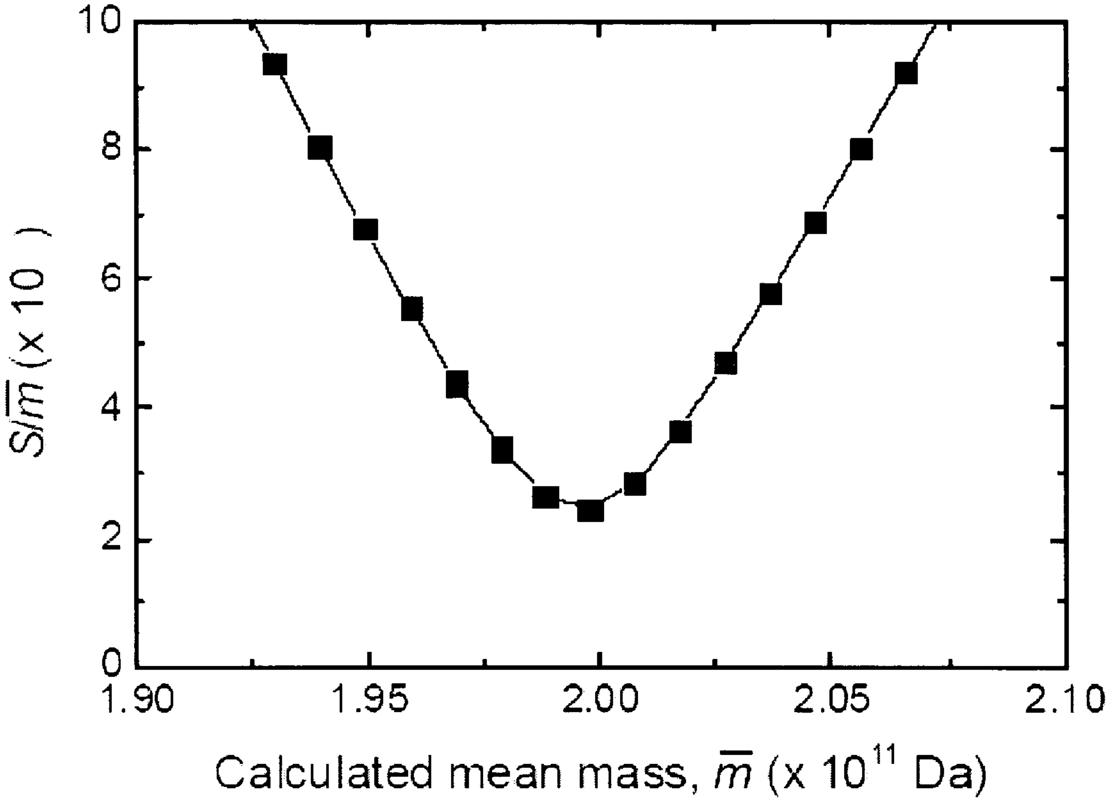
FIG. 4 is a graph showing standard deviation values plotted against their respective average mass values for a particle analyzed using the apparatus of FIGS. 1 and 2, and the procedure shown in FIG. 3.
Figure 5:
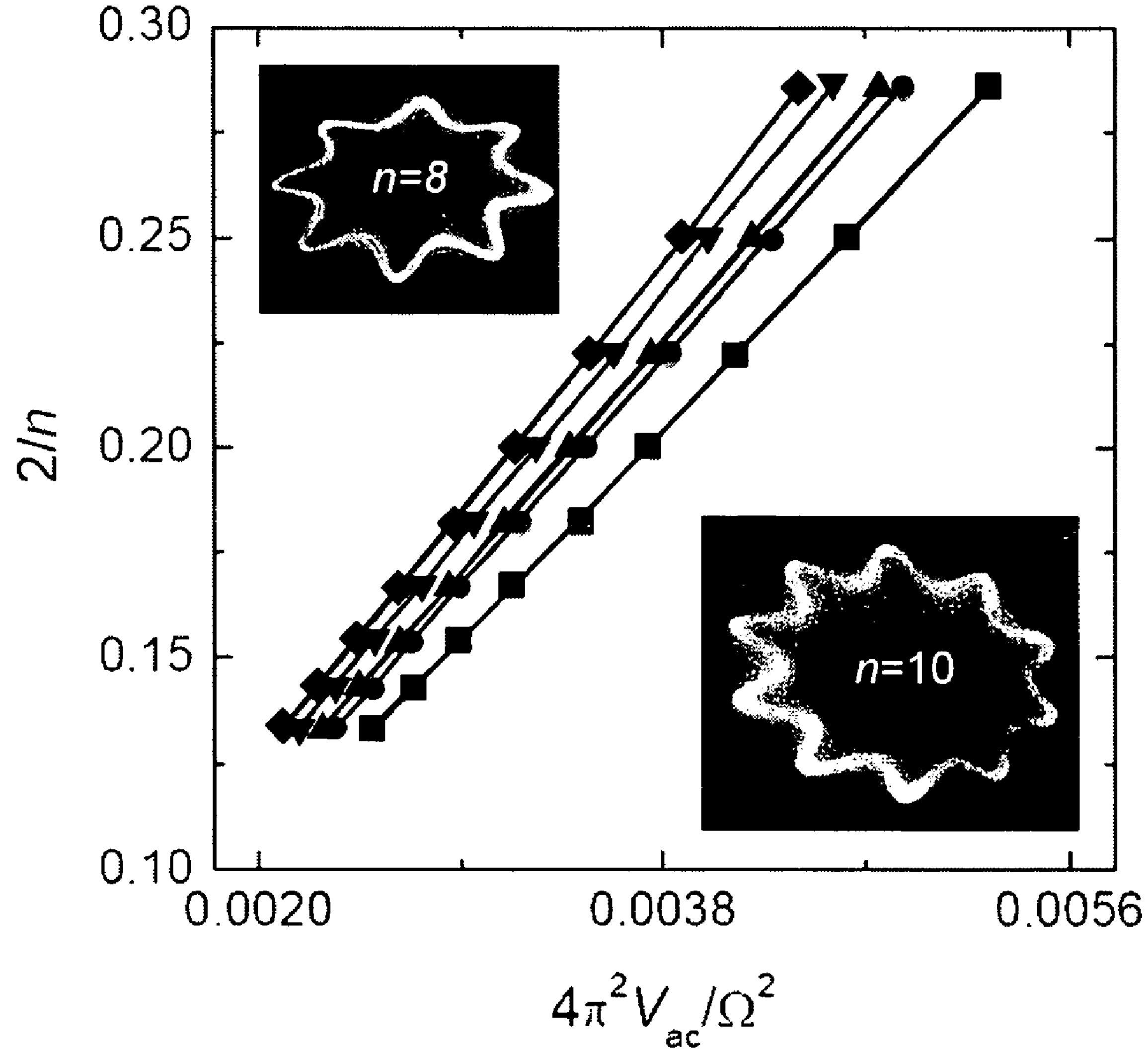
FIG. 5 is a plot of the star branch number, expressed as the value 2/n, as a function of the driving frequency and amplitude of the voltage signal applied to the Quadrupole Ion Trap (QIT) shown in FIGS. 1 and 2.

When all the possible Z value assignments (subject to the constraints imposed) have been used to evaluate the corresponding mass values $m_1, \ldots, m_N$, average mass, and standard deviation, the average mass corresponding to the lowest computed standard deviation is selected as the mass most likely to correspond to particle 150. FIG. 4, for example, shows a graph of standard deviation values plotted against their respective average mass values. The graph of FIG. 4 was obtained from a mass determination analysis performed using the procedure described in FIG. 3 for a single polystyrene microsphere particle that was subjected to four consecutive electron bombardments, resulting in five different charge states for that particle. The electron bombardments, and other aspects of the mass spectrometry analysis, were performed using an apparatus such as that shown in FIGS. 1 and 2. As can be seen from FIG. 4, the standard deviation analysis enables identification of the minimum standard deviation value, thereby enabling identification of a likely mass value for the particle. FIG. 4 shows that the minimum standard deviation occurs for a mass value of approximately $1.9977\times10^{11}$ Da. The selected average mass value, as shown in FIG. 4, corresponds to assigned charge numbers (i.e., Z values) of 202, 204, 206, 207, and 209. It will be understood that multiple resonance conditions may exist for any given charge state for particle 150. For example, shown in FIG. 5 is a plot of the star branch number (or more particularly the value 2/n) as a function of the QIT's driving frequency and the amplitude of the applied voltage signal $V_{ac}$ when an *E. coli* K-12 particle was placed in the QIT 102. As can be seen, for each of the different charge states, there are multiple points on each line corresponding to integer values of n. So, for example, by adjusting the driving frequency at a given charge state various stationary patterns (such as the stationary star-like trajectories with eight and ten branches shown inset in FIG. 5) may be obtained.

After selecting the most likely mass value for the particle 150, the identity of the biological sample may be determined by comparing, manually and/or automatically, the selected mass value to a list of mass values associated with corresponding biological organisms. The species whose mass is consistent with the selected mass value is deemed to be the species most likely to correspond to the sample that was analyzed. Thus, in the example of FIG. 4, the selected average mass value of $1.9977\times10^{11}$ Da is well within the mass distribution limit for a monomeric polystyrene microparticle, whose mass is $1.96\pm0.16\times10^{11}$ Da.

Figure 6B:
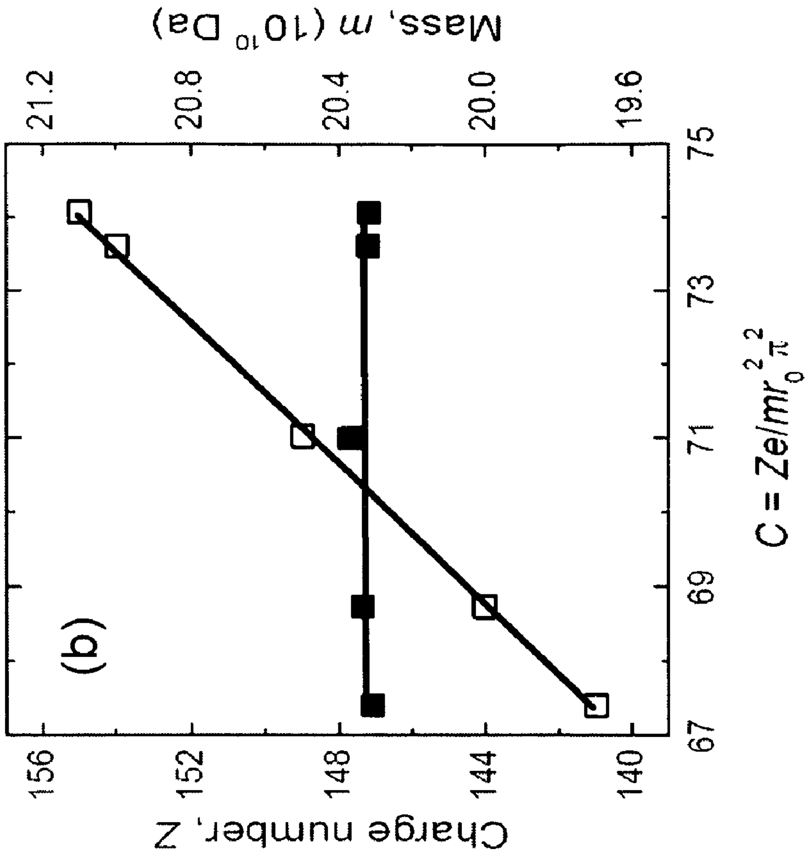
FIGS. 6A–B are plots of the selected assigned charge numbers versus the corresponding computed mass values for a particle analyzed using the apparatus of FIGS. 1 and 2, and the procedure shown in FIG. 3.
Figure 6A:
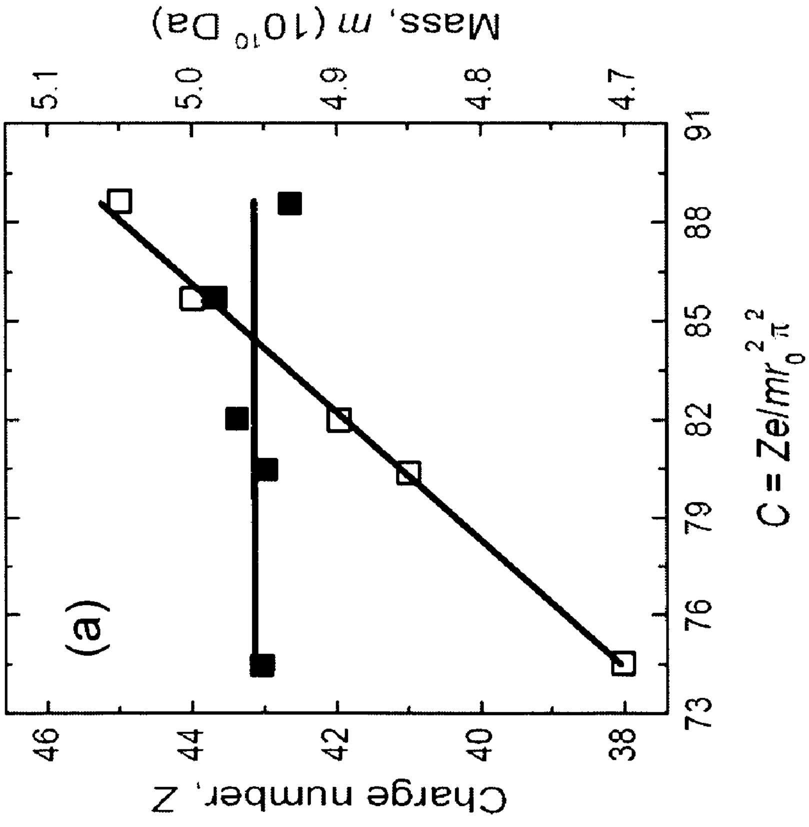

In another example, FIG. 6A shows a plot of the selected assigned charge number Z (indicated as white squares and corresponding to charge numbers of 38, 41, 42, 44, and 45) versus the corresponding mass values computed, yielded an average mass value of $m=4.957\pm0.020\times10^{10}$ Da. This average selected mass value was within the $\pm0.14\times10^{10}$ Da mass variation for *E. coli* K-12 particles (having a typical mass of $5.03\pm0.14\times10^{10}$ Da). This mass corresponds to a weight of 82.3±0.3 fg per *E. coli* dry cell.

In the course of the measurement, clusters of bacterial whole cells were discovered in the gas phase. Such cluster macroions were identified from the brightness of the star patterns displayed on the CCD camera. Shown in FIG. 6B is a plot of the selected assigned charge numbers (indicated again as white squares) versus the corresponding mass values for a single cluster particle confined in the ion trap. As can be seen from FIG. 6B, the cluster was nearly four times heavier than the monomeric particle associated with FIG. 6A, but carried only 3.5 times more charge, with the measurement precision approaching 0.1%. A comparison of the measured masses in FIGS. 6A and 6B indicated that the gaseous macroion corresponding to FIG. 6B was an *E. coli* K-12 tetramer.

Figure 7:
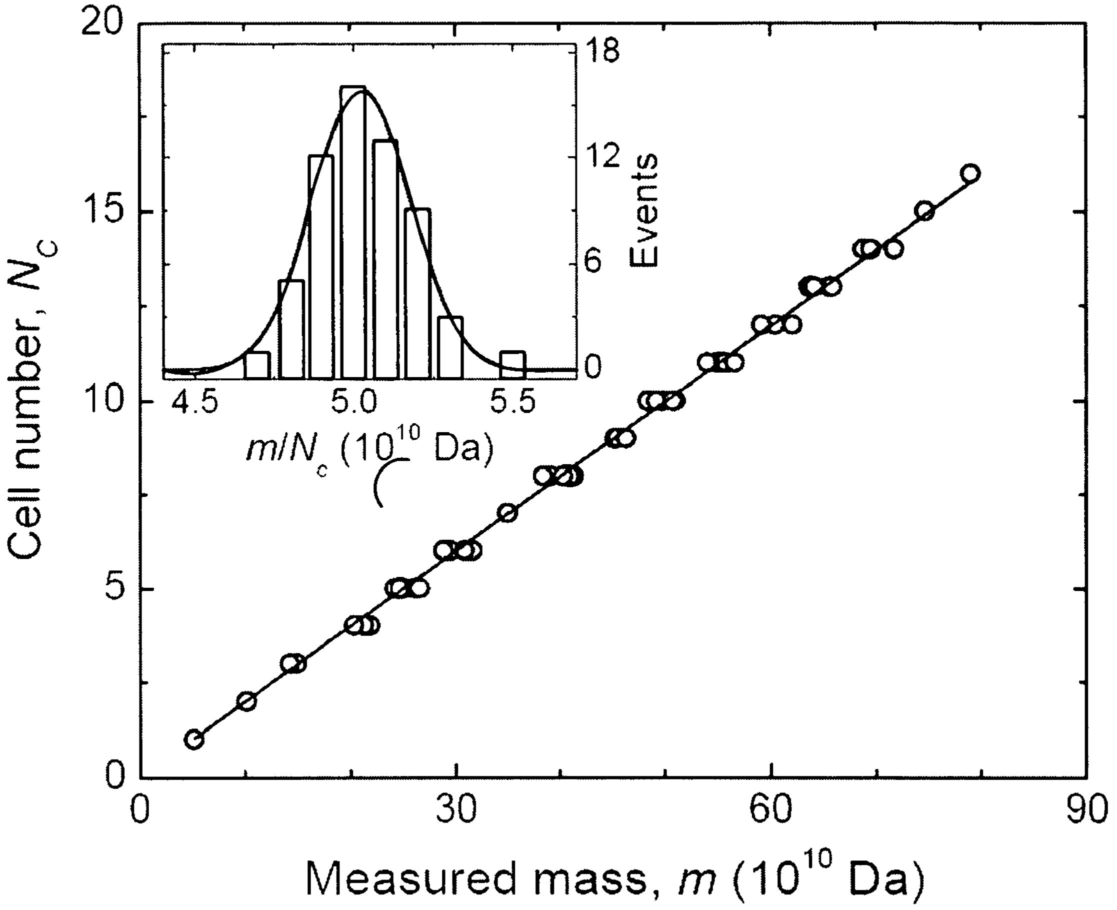
FIG. 7 is a plot of the assigned cell number, $N_c$, versus the measured mass of particles analyzed using the apparatus of FIGS. 1 and 2, and the procedure shown in FIG. 3.

Clusters comprising up to sixteen *E. coli* whole cells, or clusters of whole cells of other biological organisms, were similarly identifiable. For the cluster ions, accurate cell number assignment was made from repetitive measurements for a large number of particles (both monomers and multimers). Following a similar iterative procedure for the charge state determination, as discussed herein, the cell number ($N_c$) was uniquely assigned from a standard deviation analysis in the linear least-squares fitting of the experimental data plotted in terms of $N_c$ versus m, as shown in FIG. 7. The plot of FIG. 7 may be used to determine an average mass of $m/N^c=5.03\pm0.14\times10^{10}$ Da for a single *E. coli* K-12 whole cell in vacuum (inset in FIG. 7) or a dry weight of 83.5±2.3 fg per particle.

For *E. coli* K-12, it is known that the bacterium prior to dehydration contains 70–80% water. Assuming a water content of 75%, a wet weight of 0.334 pg was calculated. This conforms to the estimate of 0.31 pg, deduced from the size (~1.0 μm long and ~0.6 μm in diameter as observed by scanning electron microscopy) and the density (~1.1 g/cm$^3$) of the bacterium.

Applications

Thus, as has been described herein, by using mass spectrometry based on MALDI-QIT-Light Scattering procedure, and/or other mass spectrometry procedures using other ionization and mass spectrometry analyses techniques, it is possible to very accurately measure the masses of individual biological organisms, such as, for example, *E. coli* K-12 whole cells, with accuracy approaching 0.1%. The procedure may also be used to accurately determine the masses of non-biological samples. The mass measurement accuracy does not depend on the microorganisms examined but may be primarily attributed to the instability of the electric field inside the QIT and mechanical imperfections owing to the machining error (~0.1%), as well as errors resulting from truncation and misalignment of the ion trap electrodes.

Analysis results obtained for bacterial particles highlight the potential application of MALDI-QIT-ELS to the detection of single viral particles, which are about 10-fold smaller in size than *E. coli* K-12. Virus detection may be accomplished, for example, by implementation of a forward light scattering scheme to increase the detection sensitivity by 1 to 2 orders of magnitude. With this enhancement, the size detection limit can be reduced to 100 nm. Hence high precision mass measurement of single viral particles (such as the SARS virus) would be possible with this optically based approach.

The method, when applied to bacteria or viruses that have characteristic masses, may represent an extension of the "top-down" approach toward rapid identification of intact microorganisms by mass spectrometry. The technique may also be applied, for example, to the study of eukaryotic cells (such as red blood cells) which are typically larger than 1 μm and may be probed readily with the biological whole cell mass spectrometer presently disclosed.

Voltage Detector

Figure 8:
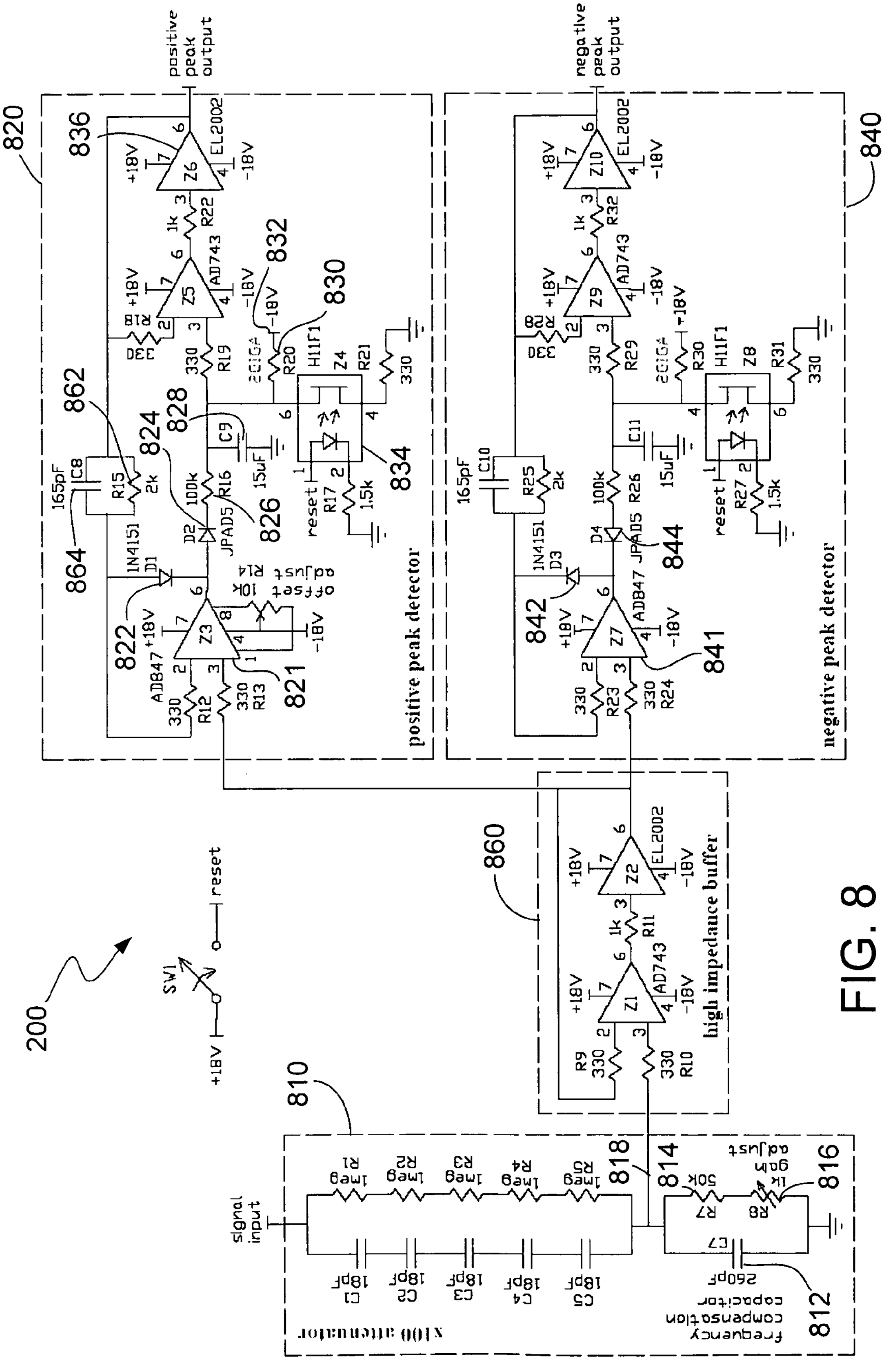
FIG. 8 is a schematic of the averaging peak-to-peak voltage detector circuit used with the apparatus shown in FIG. 2.

Since the measured value of C, as shown in Equation (5), that is used to compute the mass of the particle 150 depends on the value of $V_{ac}$, it is important to accurately determine $V_{ac}$. FIG. 8 shows a circuit schematic of a peak-to-peak voltage detector 200 used to determine the value of $V_{ac}$. As shown in FIG. 2, the detector 200 measures the peak-to-peak voltage difference between the electric fields applied to the end-cap electrode 127*b* and the ring electrode 128. Because the AC voltages applied to these two electrodes are 180° out-of-phase, the voltage amplitude $V_{ac}$ is accordingly equal to one quarter of the measured peak-to-peak voltage detected by the detector 200 (i.e., $V_{ac}=V_{pp}/4$, where $V_{pp}$ is the measured peak-to-peak voltage). It will be appreciated, however, that $V_{ac}$ may be determined using other types of detectors, and that such detectors may be coupled to the QIT 102, and/or to the various components of the driver system 120 in various ways.

Returning to FIG. 8, the design of the detector 200 is based on conventional peak detectors implemented, for example, using operational amplifiers (op-amps). The detector 200 includes two similarly constructed peak detectors 820 and 840 for the positive voltage peak detection and negative voltage peak detection, respectively. As shown in FIG. 8, coupled to the input of the peak detectors 820 and 840 is an attenuator 810, that attenuates the input signal presented at the terminal of the end-cap electrode 127*b* so that the level of the input signal presented to the peak detectors 820 and 840 conforms to their operating range. In the illustrated embodiment, the attenuator 810 attenuates the signal by a factor of 100. By appropriate choice of a capacitor 812 of the RC network that comprises the attenuator 810, the AC component of the signal may be compensated, as is similarly done in standard 10× scope probes. Thus, by compensating the signal, the amplitude response remains flat for a change of frequency within a frequency range of interest.

As further seen in FIG. 8, the attenuated signal 818 at the output of the attenuator 810 is followed by a high input impedance, high current, closed-loop buffer 860 having unity gain. The signal is then routed from the buffer 860 to the positive and the negative peak detectors 820, 840. As previously noted, the positive peak detector 820 is constructed similarly to the negative peak detector 840, except that first and second clamping diodes 842 and 844 are coupled to a first op-amp 841 with a polarity that is opposite that of corresponding first and second clamping diodes 822 and 824 coupled to a second op-amp 821.

One problem that may affect the performance of the peak detector 820, and thus affect the determination of $V_{ac}$, is the presence of high frequency noise. When such noise is present, the peak voltage detector may detect the peak of the noise envelope rather than the true signal. To reduce the adverse effect of high frequency noise on the accuracy of the measurement of $V_{ac}$, a relatively large 100 kΩ resistor 826 is placed in front of a peak-holding capacitor 828. This resistor 826 and the peak-holding capacitor 828 form a simple low pass filter that attenuates the high frequency noise. Although the addition of these two components may slow the response of the overall circuit, detection of the peak voltage may be achieved after a few hundred consecutive cycles. The effects of signal noise may be remedied using other techniques, devices, and/or components.

Another problem that may affect the performance of the peak detector 820 is input voltage instability at the input to the peak detector 820. To overcome this problem, a resistor 830 is coupled to a voltage source 832, which is set to a voltage level of, for example −18V. By coupling the resistor 830 to the voltage source 832, a substantially constant current drain to the peak-holding capacitor 828 may be created such that the detected peak value is not that of a single cycle, but is instead the average peak value over many cycles. Since the time constant of the peak detection circuit is much smaller than the time constant of the individual peak, each individual peak contributes only a fraction of the final peak value. Mathematically this is equivalent to the sum of N peak values divided by N.

During operation of the peak detector 820, the first clamping diode 822 clamps the output of the second op-amp 821, acting as a peak-holding capacitor driver, and forcing the op-amp's output to follow the input. The output of the second op-amp 821 corresponds to the voltage across the peak-holding capacitor 828 until the peak is reached. When the input reverses its slope, the second clamping diode 824 blocks the charge held in the peak-holding capacitor 828 from leaking out. Thus the peak is detected. A solid state reset switch 834 for subsequently draining the peak-holding capacitor is a bidirectional FET opto-coupler. A current buffer 836 is added to the output to increase its current driving capability. The output of the peak detector 820 may be smoothed with a smoothing circuit comprising of a smoothing resistor 862 and a smoothing capacitor 864 having experimentally selected values.

To ensure high accuracy of the measured peak voltage, high quality electrical components may be used. In the illustrated embodiment, the various resistors comprising the circuit of FIG. 8 are precision 0.1% resistors and the capacitors are stable high-voltage mica capacitors. The first clamping diode 822 is a low leakage diode and the peak-holding capacitor 828 is a metallized polyester capacitor featuring low dielectric absorption.

Figure 9A:
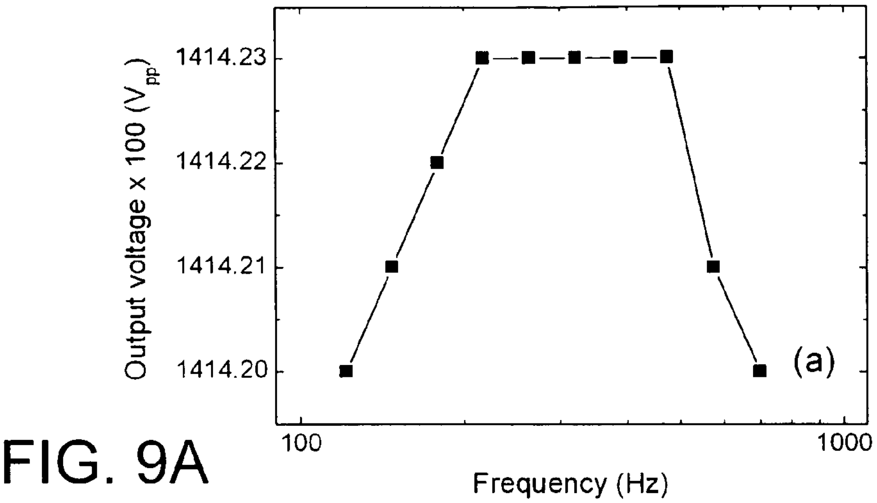
FIG. 9A is a plot of the detected output voltage of the detector circuit of FIG. 8 as a function of the driving frequency of the voltage source at a constant input voltage.

Calibration of the peak detector may be performed using, for example, a Fluke 5720A Calibrator that provides input AC voltage signals. Since the QIT 102 used for mass determination may be operated under voltage-fixed, but frequency-varying conditions, the offset and gain settings of the RC circuitry of the attenuation module 810 may be adjusted so as to achieve the highest measurement accuracy for a particular peak-to-peak voltage $V_{pp}$ in a specific frequency range. For example, the offset and gain settings may be adjusted by adjusting the values of the capacitor 812, and of the resistors 814 and 816 shown in FIG. 8. Thus, FIG. 9A shows the output voltage of the peak detector circuit 200 as a function of the frequency (in the range of 100–700 Hz) at a constant input peak-to-peak voltage of 1414.21 V. As can be seen, at higher frequencies the measured peak tends to drop due to the speed limitation of the overall circuit, and at lower frequencies the peak value tends to drop due to charge leakage of the peak-holding capacitor voltage. The speed limitation is due to the limited speed response of the various operational amplifiers, which impacts the overall response of the circuit.

Figure 9B:
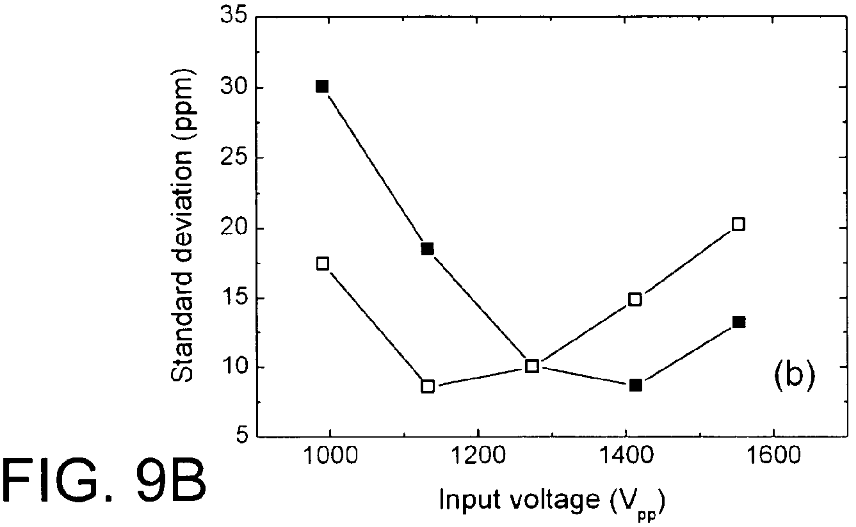
FIG. 9B is a plot of the standard deviation of the detected output voltage as a function of the input voltage for two separate calibrations performed for the circuit of FIG. 8.
Figure 9C:
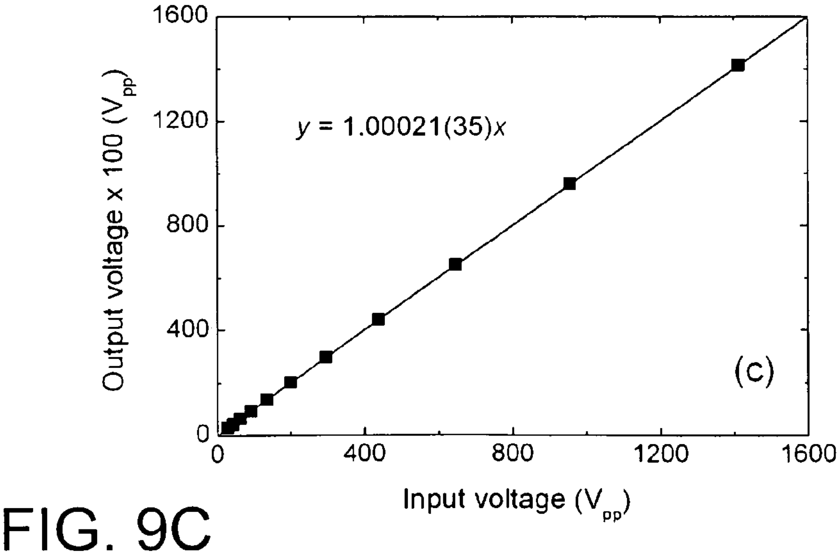
FIG. 9C is a plot of the voltage measured by the peak detection circuit of FIG. 8 versus the input voltage generated by the AC driver shown in FIG. 2.

The importance of calibrating the peak detection circuit may be illustrated through the standard deviation analysis shown in FIG. 9B. After determining appropriate sets of values for the capacitor 812 and/or resistors 814 and 816 for two separate voltage values ($V_{pp}$=1272.79 V and 1414.21 V), ten different output voltage measurements were performed over a range of frequencies for each of five input voltage levels. As shown in FIG. 9B, the minimum deviation was found at 1272.79 V and 1414.21 V, respectively, thereby showing that the detection circuit performed best when it operated at an input voltage with respect to which it was calibrated. It is to be noted that in calibrating the peak detection circuit 200, the lowest standard deviation may be achieved for a particular desired frequency range, such as, example, for 100–700 Hz, and for a particular peak-to-peak voltage. FIG. 9C therefore shows that there will be small deviations in the voltage measured by the peak detection circuit 200 compared to the input voltage from the Fluke 5720A calibrator. However, the measured deviations are small (average gain shown in FIG. 9C was determined to be 1.00021±0.00035), thus showing that the error involved in the measurement increases somewhat, but is still smaller than 350 ppm over a wide voltage range.

A number of embodiments of the invention have been described. Nevertheless, it will be understood that various modifications may be made without departing from the spirit and scope of the invention. Accordingly, other embodiments are within the scope of the following claims.

What is claimed is:

1. A method for identifying a biological organism, the method comprising:

providing a biological sample containing the biological organism, causing the biological sample to transitions between charge states, for each charge state, performing a mass spectrometry analysis of the sample while the sample is in that charge state, and identifying the biological organism in accordance with the mass spectrometry analyses.

2. The method of claim 1, wherein providing the biological sample comprises providing a sample having biological organisms, each of which has a mass of at least $1\times10^9$ Da.

3. The method of claim 1, wherein causing the biological sample to transition between charge states includes performing, on the biological sample, at least one of: Matrix-Assisted Laser Desorption Ionization (MALDI), Electrospray ionization, and Laser-Induced Acoustic Desorption (LIAD).

4. The method of claim 3, wherein performing MALDI on the biological sample comprises:

placing the biological sample in a solution matrix, and irradiating the matrix with laser illumination.

5. The method of claim 4, further comprising selecting the solution matrix to include at least one of sinapinic acid (SA), 4-hydroxy-α-cyanocinnamic acid (4HCCA), and 2-(4-hydroxy-phenylazo)-benzoic acid (HABA).

6. The method of claim 4, wherein irradiating the matrix with laser illumination comprises irradiating with pulses of laser light.

7. The method of claim 1, wherein performing the mass spectrometry analysis comprises:

directing the charged sample to a Quadrupole Ion Trap (QIT), and applying an AC voltage to the QIT.

8. The method of claim 7, further comprising:

projecting light on the charged sample while the sample is in one of the charge states.

9. The method of claim 7, wherein applying the AC voltage includes choosing at least one of an adjustable amplitude, and an adjustable frequency, to cause ejection of at least some of the ions in the charged sample from the QIT.

10. The method of claim 7 further comprising, for each of the plurality of charge states, choosing a frequency of the AC voltage to achieve resonance conditions within the QIT.

11. The method of claim 1, wherein causing the biological sample to be in the plurality of charge states includes illuminating the ionized sample with an electron beam.

12. The method of claim 8, wherein projecting light includes illuminating the charged sample with laser light.

13. The method of claim 12, wherein illuminating with laser light includes illuminating with continuous visible laser light.

14. The method of claim 8, further comprising:

collecting light scattered from the charged sample, and guiding the collected scattered light to a detector.

15. The method of claim 7, wherein identifying the biological organism includes:

for each of the plurality of produced charge states of the charged sample, identifying characteristics indicative of a mass/charge relationship associated with the charged sample in that charge state, and estimating a mass, m, of the ionized sample, based on the characteristics.

16. The method of claim 15, wherein identifying characteristics comprises determining a number of branches, n, of star patterns associated with the trajectory of the charged sample in the QIT.

17. The method of claim 15, wherein estimating the mass, m, of the charged sample includes:

assigning sets of values for each of the plurality of charge states produced, computing respective average mass values and corresponding standard deviation values for each of the assigned sets of values, selecting, from the respective computed average mass values, the average mass value having the minimum corresponding standard deviation, and assigning the selected average mass value to be an estimate of the mass of the charged sample.

18. The method of claim 17, further comprising identifying, from a list of mass values associated with corresponding biological organisms, that organism having an associated mass consistent with the estimated mass value.

19. An apparatus for identifying a biological organism, the apparatus comprising:

a receptacle that receives a biological sample containing the biological organism, an ionization module that ionizes the biological sample to produce an ionized sample, a charging module that causes the ionized sample to transition between charge states, a mass spectrometry analyzer that analyzes the ionized sample for at least some of the charge states, and a processing module that identifies the biological organism in accordance with the analysis of the ionized sample.

20. The apparatus of claim 19, wherein the receptacle is configured to receive a biological sample having biological organisms, each of which has a mass of at least $1\times10^9$ Da.

21. The apparatus of claim 19, wherein the ionization module is configured to perform, on the biological sample, at least one of: Matrix-Assisted Laser Desorption Ionization (MALDI), Electrospray ionization, and Laser-Induced Acoustic Desorption (LIAD).

22. The apparatus of claim 21, wherein the receptacle is configured to hold a solution matrix, and wherein the ionization module comprises a first laser for irradiating the matrix with laser illumination.

23. The apparatus of claim 22, wherein the solution matrix includes at least one of: sinapinic acid (SA), 4-hydroxy-α-cyanocinnamic acid (4HCCA), and 2-(4-hydroxy-phenylazo)-benzoic acid (HABA).

24. The apparatus of claim 22, wherein the first laser comprises a pulsed UV laser.

25. The apparatus of claim 19, wherein the mass spectrometry analyzer comprises:

a Quadrupole Ion Trap (QIT) that receives the ionized sample, an AC voltage source that is applied to the QIT to cause radial motion of the ionized sample in the QIT, and a light source that projects light on the ionized sample while the ionized sample is in one of the charge states.

26. The apparatus of claim 25, wherein the AC voltage source has an adjustable amplitude and an adjustable frequency, the amplitude and frequency being adjustable to values that cause ejection of at least some of the ions in the ionized sample from the QIT.

27. The apparatus of claim 25, wherein for the AC voltage source has an adjustable frequency, the adjustable frequency being adjustable to achieve resonance conditions within the QIT for each of the plurality of charge states.

28. The apparatus of claim 19, wherein the charging module comprises an electron beam generator that illuminates the ionized sample with an electron beam.

29. The apparatus of claim 28, wherein the electron beam generator comprises a tungsten filament.

30. The apparatus of claim 25, wherein the light source includes a second laser.

31. The apparatus of claim 30, wherein the second laser is a continuous visible-light laser.

32. The apparatus of claim 25, further comprising:

optical lenses that collect light scattered from the ionized sample, and a charge-coupled device (CCD) that receives the collected scattered light.

33. The apparatus of claim 25, wherein the processing module comprises a processor, and storage containing computer instructions that cause the processor, when executed, to:

for each of the plurality of produced charge states of the ionized sample, identify characteristics indicative of the mass/charge relationship associated with the ionized sample in that charge state, and estimate a mass, m, of the ionized sample, based on the characteristics.

34. The apparatus of claim 33, wherein the instructions for identifying instructions to characteristics comprise instructions to determine a number of branches, n, of star patterns associated with the trajectory of the ionized sample in the QIT.

35. The apparatus of claim 33, wherein the instructions to estimate the mass, m, of the ionized sample include instructions to:

assign sets of values for each of the plurality of charge states produced, compute respective average mass values and corresponding standard deviation values for each of the assigned sets of values, select, from the respective computed average mass values, the average mass value having the minimum corresponding standard deviation, and assign the selected average mass value to be an estimate of the mass of the ionized sample.

36. The apparatus of claim 35, wherein the instructions further cause the processor, when executed, to identify from a list of biological organisms with associated mass values, that organism having an associated mass consistent with the estimated mass value.

37. A computer product stored on a computer-readable medium on which are stored instructions to facilitate identifying a biological organism from a biological sample such that, when executed on a processor-based device, the instructions cause the processor-based device to:

receive a plurality of parameters, each corresponding to a plurality of mass/charge relationship values associated with a respective plurality of charge states produced for the sample, assign sets of values for each of the plurality of charge states produced, compute respective average mass values and corresponding standard deviation values for each of the assigned sets of values, select from the respective computed average mass values, the average mass value having the minimum corresponding standard deviation, and assign the selected average mass value to be an estimate of the mass of the ionized sample.

38. The computer product of claim 37, wherein the instructions further comprise instructions that cause the processor-based device to identify from a list of biological organisms and associated mass values, that organism having an associated mass consistent with the estimated mass value.

* * * * *